June 1, 1948. B. J. HASKINS 2,442,649
MAGNETO TESTING AND INDICATING APPARATUS
Filed Sept. 30, 1943 3 Sheets-Sheet 1

Inventor:
Butler J. Haskins
By Chritton, Wiles, Davies,
Schroeder & Merriam
Attorneys

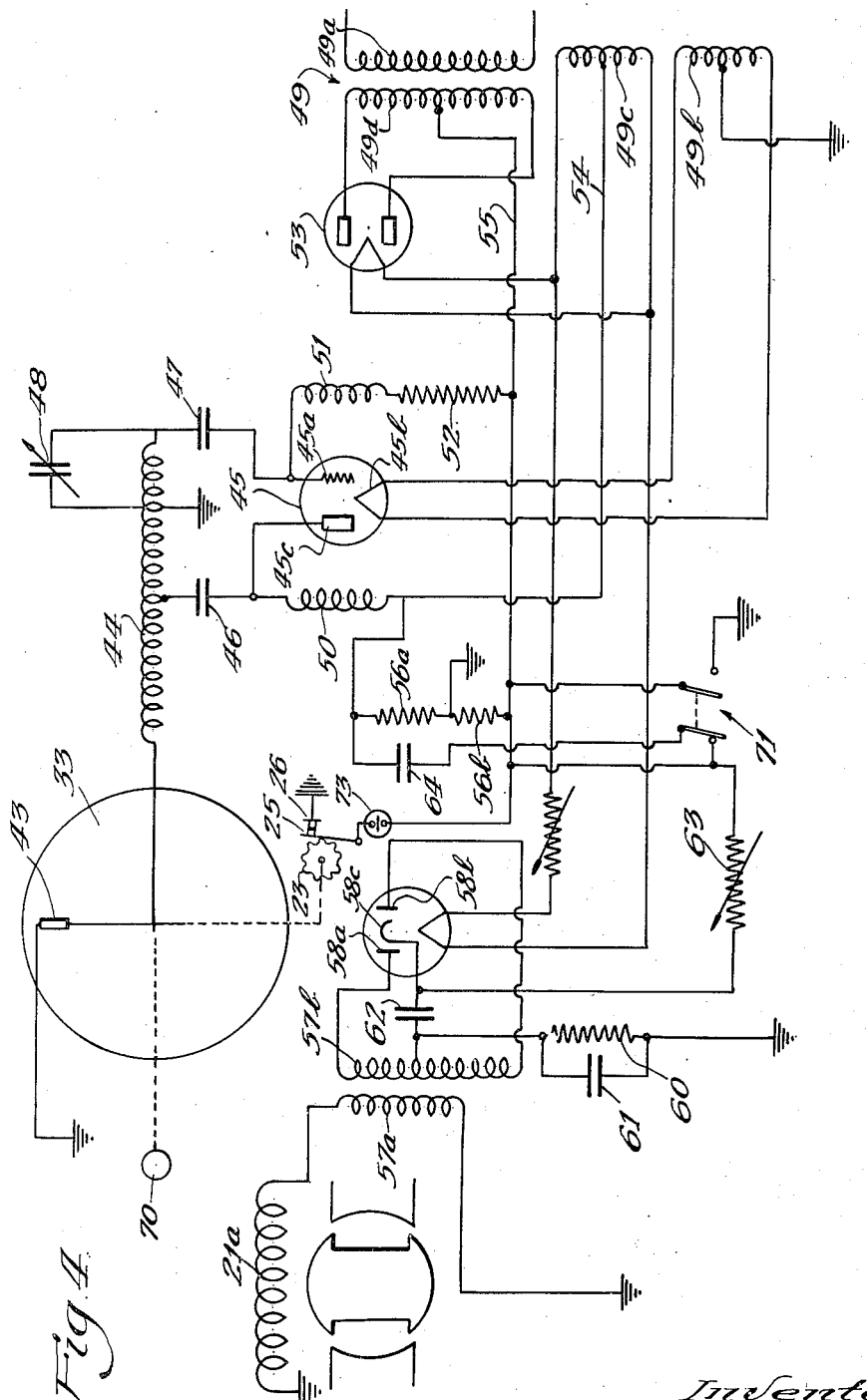

June 1, 1948. B. J. HASKINS 2,442,649
MAGNETO TESTING AND INDICATING APPARATUS
Filed Sept. 30, 1943 3 Sheets-Sheet 3
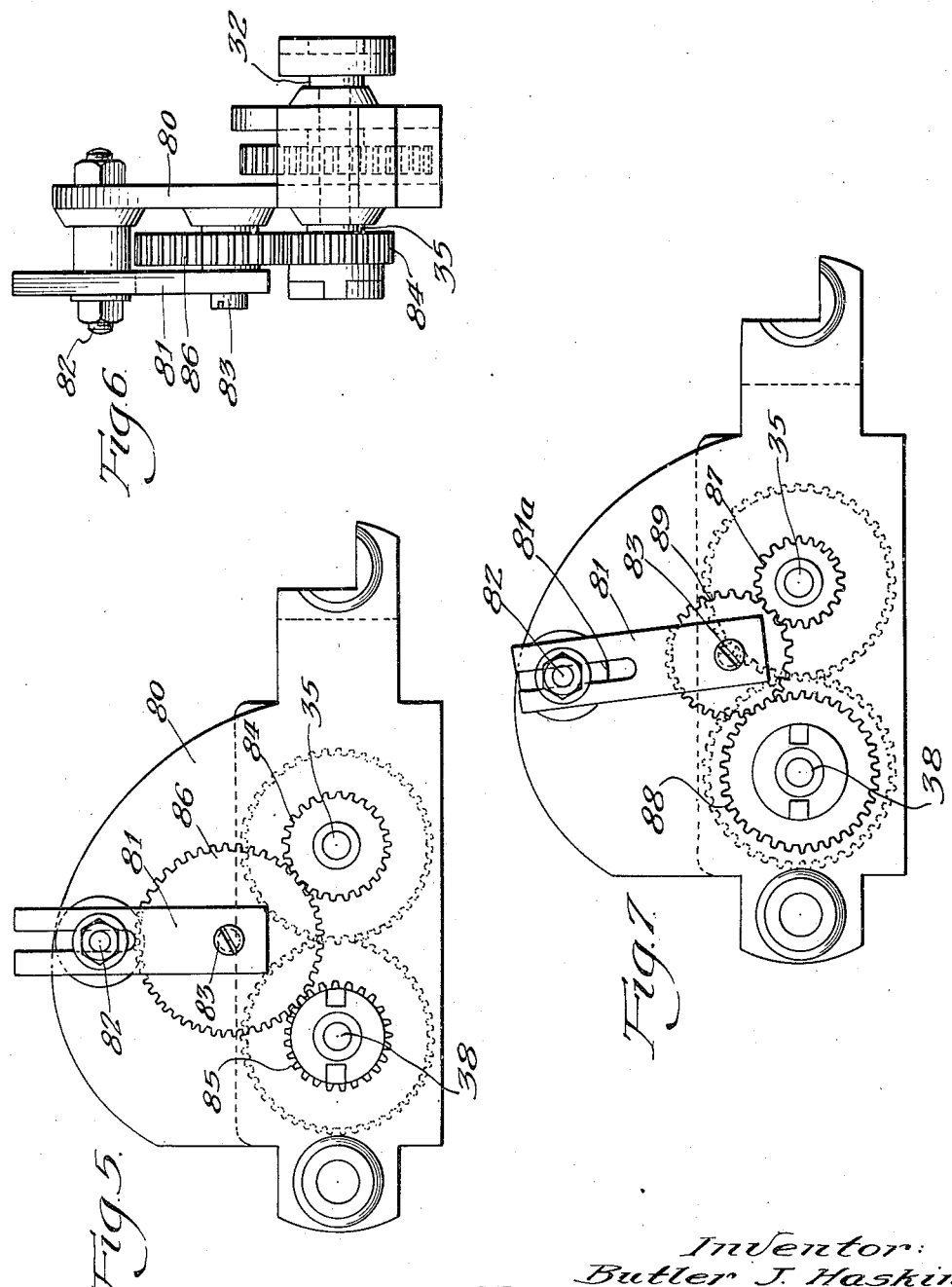
Inventor:
Butler J. Haskins
By:
Chitton, Wiles, Davies, Schroeder & Merriam
Attorneys Patented June 1, 1948

2,442,649

UNITED STATES PATENT OFFICE 2,442,649

MAGNETO TESTING AND INDICATING APPARATUS

Butler J. Haskins, Fox Lake, Ill., assignor to Joseph Weidenhoff, Inc., a corporation of Illinois Application September 30, 1943, Serial No. 504,361

3 Claims. (Cl. 177—311)

This invention relates to magneto testing method and apparatus, and more particularly to improved means for testing and setting magnetoes of the type conventionally used in aircraft.

Figure 2:
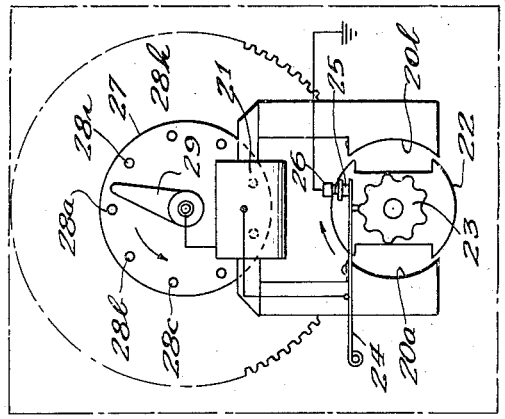
Figure 3:
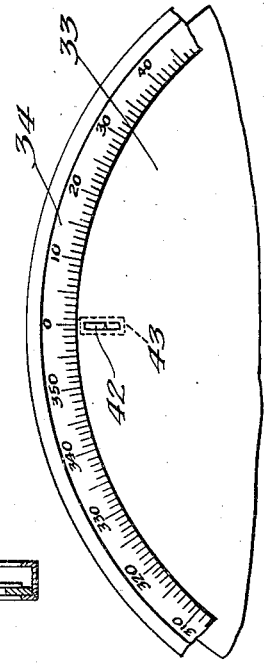
Figure 1:
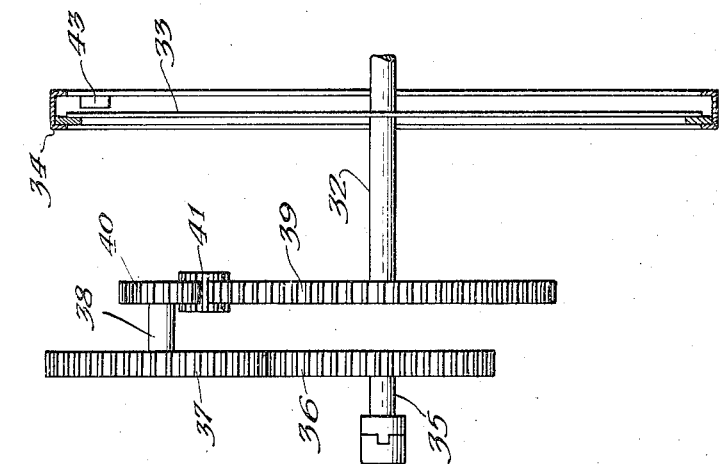

One feature of this invention is that tests of the magneto may be made without disassembling it; another feature of this invention is that it enables certain tests and setting operations to be made with the compensated cam in place, where the magneto has such a cam, as is commonly the case in aircraft magnetos; still another feature of this invention is that it provides an accurate indication of the opening and closing of the breaker points, and of the condition of the operating portions of each cam lobe, as distinguished from some arbitrary portion, as the top of the lobe, which does not actually effect operation or change in condition of the breaker points; yet another feature is the provision of means for accurately and conveniently calibrating the tachometer used to determine the speed at which the magneto is driven during testing; a further feature of this invention is a method of testing distributor caps for cracks and imperfections. Other features and advantages of this invention will be apparent from the following specification and the drawings, in which:

Figure 1 is a schematic illustration of the pertinent mechanical portion of apparatus embodying my invention; Figure 2 is a front view, partially diagrammatic, of the magneto and distributor; Figure 3 is a fragmentary detail view of part of the indicating arrangement associated with the magneto; Figure 4 is a circuit diagram of the pertinent portion of the circuit of apparatus embodying my invention; Figure 5 is an elevational view of the selective gearing arrangement used in the connection between the magneto and the rotating indicating member; Figure 6 is a side elevational view of the device shown in Figure 5; and Figure 7 is a view similar to that of Figure 5, but showing a different set of gears in use to provide a different gear ratio.

Magnetos are becoming an increasingly important source of ignition current for internal combustion engines, particularly aircraft engines, and I have devised new equipment for testing magnetos, determining the condition of the various magneto parts and whether they are properly performing their various functions, enabling accurate timing of the magneto, correct setting of the cams and breaker points, and the like. Such equipment is also the subject of other copending applications, more particularly my application Serial No. 472,727, filed January 18, 1943, now Patent No. 2,402,749, dated June 25, 1946, and my application Serial No. D. 111,159, filed September 18, 1943.

The initial operation in the procedure of testing a magneto is the determination of the neutral position of the rotor, the position at which flux linkage through the primary winding has dropped to zero and is reversing, since this neutral position is the reference point used by magneto manufacturers for furnishing information as to the setting of various parts of the magneto, the closure time of the breaker points being generally given as so many degrees before neutral, the E-gap as a certain number of degrees past neutral, and the like. The application first mentioned above is directed particularly to means for electrically determining the neutral position of the rotor. This is accomplished by connecting a rotatable indicating member to the magneto rotor for rotation in predetermined relation thereto, rotating the rotor and indicating means in a certain direction, actuating indicating apparatus to determine when the voltage in a magneto winding has reached a certain value as a result of the position of the rotor, then reversing the rotation of the parts and determining the position thereof when the voltage has reached the same value, neutral position being midway between the positions thus determined by the indicating arrangement.

The test procedures with which the present application is concerned and to which its claims are directed are made after neutral position of the rotor has been determined, and are independent of the manner in which this determination is made. The method of electrically determining neutral, described and claimed in the application first mentioned above, is preferred because of its accuracy and convenience; but the test procedures described and claimed here can be performed if neutral position of the rotor has been determined mechanically by feeler gauges or the like. The novel and improved design which I have used for this magneto testing equipment is the subject of the second copending application mentioned above.

Referring now more particularly to Figures 1, 2, and 3, all of the parts customarily contained within a single housing in an aircraft magneto are illustrated as within a dotted line box. The current generating means, or magneto proper, is here shown as having a frame 20 with pole faces 20a and 20b within which revolves a rotor 22. The upper part of the frame carries an inductance coil 21 having primary and secondary windings. A cam 23 is adapted to actuate the movable arm 24 carrying the movable point of a pair of breaker points 25 and 26. In accordance with conventional magneto practice, rotation of the rotor, by varying the magnetic flux, generates a current through the primary and thus a field around it, and when the field has reached a desired maximum, the breaker points are opened to cause a sudden change which generates a high voltage in the secondary.

The high voltage in the secondary is delivered to the distributor arm 29 of a distributor comprising an insulating block 27 having terminals 28a—i equally spaced about the axis of rotation of the arm 29. The distributor arm and the rotor of the magneto rotate in a fixed relation or fixed ratio to each other determined by the drive gears 30 and 31, the ratio illustrated in this case being 4½ to 1 so that the rotor makes 4½ revolutions for each revolution of the distributor shaft.

The magneto and distributor illustrated might be used, for example, to supply ignition current to a nine-cylinder radial engine. Normally a four-pole magneto would be used in connection with an engine having that many cylinders, but my invention is here being described in connection with a two-pole magneto for convenience of illustration and description. The various test procedures and arrangements described here would be the same for a magneto having four or more poles, except that the gear ratios would be different. In such an aircraft magneto as that shown here, the breaker points are generally actuated by a compensated cam which is driven at the same speed as the distributor arm 29, different from that of the rotor. This drive is here illustrated as effected through a small second gear box 23a, it being understood that this box would contain gears having the same ratio as the gears 30 and 31, although in practice the same shaft which is used to drive the rotor arm 29 may be used to actuate the cam 23, which eliminates the second set of gearing. Since the connecting rod angles of a radial engine are different, the cam 23 must be compensated for this difference and cause opening of the breaker points at different angular distances between firing positions. It is for this reason that an actual test which indicates the points of opening and closing of the breaker points is important, the method commonly used heretofore having been to us gauges on the top of the cam lobes, whereas the actual points of wear were on the sides of the lobes.

The drive shaft of the magneto assemby is connected, through appropriate gearing which will be further described hereafter, to the shaft 32 carrying a rotatable indicating member or disc 33 adapted to cooperate with a substantially annular scale 34. The shaft 32 provides drive means for rotating the indicating disc and the magneto rotor and other rotatable parts, being in turn driven by an electric motor having reversing and speed controlling arrangements associated with it. The motor and its controls are not illustrated, since they are conventional and form no part of the present invention.

In order to enable testing of an aircraft type magneto with the compensated cam in place, and other test procedures more fully described hereafter, it is essential that the indicating disc 33 rotate at the same speed and preferably in the same direction as the distributor arm 29. Accordingly, selective ratio drive means is interposed between the shaft 32 and the drive shaft of the magneto assembly, this comprising a selective gear transmission, more fully illustrated in Figures 5-7, adapted to enable testing of different magnetos by always providing a gear ratio equal to that between the rotor and the distributor. In the case illustrated, the gears 36 and 37 are of the same size and mesh with each other, the gear 36 being carried by a shaft 35 and the gear 37 carried by an idler shaft 38. This latter shaft also carries a gear 40 which meshes with an idler gear 41 in turn meshing with a gear 39 carried by the shaft 32.

As may be best seen in Figure 3, the disc member 33 is provided with a slot 42 and carries a neon or glow lamp 43 therebehind. This lamp is rotatable with the disc member 33 and visible only through the slot, so that change in the illumination of the lamp causes alternate light and dark bands to be visible during rotation of the disc. The rotatable disc member 33, the lamp 43, and the annular scale 34 provide indicating apparatus which not only enables determination of the neutral position of the magneto rotor in the manner more fully described in my copending application, Ser. No. 472,727, now Patent No. 2,402,749, dated June 25, 1946, but also testing for opening and closure of the breaker points, point bounce, compensated cam wear, etc.

This indicating apparatus and the use of an oscillator for energizing the glow lamp and causing illumination thereof are the subject matter of my earlier Patent No. 1,966,066, which issued July 10, 1934, directed to distributor testing equipment for automotive distributors and ignition systems, and Patent No. 2,136,924 of one Ralph Reitherman, which issued November 15, 1938. Since the construction and operation of the indicating apparatus and its oscillator energizing circuit is fully disclosed in such prior patents, the present description thereof will be kept as brief as possible consistent with providing a sufficient disclosure for the purpose of this application, the reader being referred to such prior patents to supplement the present disclosure as to any other details in which he might be interested.

The neon or glow lamp 43 carried by and rotatable with the indicating disc 33 is energized by a high frequency alternating current generated by an oscillator, change of some electrical condition in the magneto being used to control the opertion of the oscillator and thus the energization of the lamp. Change in illumination of the lamp, in conjunction with rapid rotation of the indicating disc 33 during operation of the magneto testing equipment, provides a very accurate indication of the time of the electrical condition being used for such control. In my earlier Patent No. 1,966,066, mentioned above, opening and closing of the breaker points was used to control the ignition of the glow lamp. Heretofore, in testing magnetos of the type having compensated cams, this was not possible because of the difference in the rate of rotation of the rotor and of the cam which actuates the breaker points. I have found that a complicated aircraft type magneto with a compensated cam, adapted for use on a radial engine, can be tested with accuracy and convenience on equipment of the kind disclosed here by the use of gearing between the magneto drive shaft and the indicator disc shaft, with some means of convenient selection of the drive ratio, and with this ratio always selected to be equal to the ratio of the gearing built into the magneto and providing a driving connection between the rotor and the distributor arm. When such a magneto is tested in this manner, the points of change of illumination of the lamp recur exactly at the same points around the test disc, and there would be nine light areas and nine dark areas corresponding to the nine firing actions of the magneto in actual use. Previous methods of magneto testing showed certain factors of interest in the magneto operation, as spark length, but did not show the condition of the actual operating cam, nor the actual firing spacing between the various firing positions.

Referring now more particularly to Figure 4, it will be seen that the glow lamp 43 has one terminal connected to ground and the other terminal connected to one end of a coil 44 which acts both as an auto-transformer and as an inductance in the tank circuit of the oscillator. The oscillator is here shown as comprising a tube 45 having rigid, cathode and plate elements 45a, 45b and 45c, respectively. The grid and plate elements are connected through coupling condensers 46 and 47 to a portion of the coil 44, a smaller portion of this coil being bridged by the variable condenser 48. The cathode is grounded from the midpoint of one of the secondaries 49b; and these parts, together with other conventional circuit elements such as the chokes 50 and 51 and the grid leak 52, provide an oscillator circuit of a substantially conventional type. The ends of the secondary 49d are connected with the anodes of a full wave rectifier tube 53, the cathode of this tube being connected to the ends of the low voltage secondary 49c and rectified plate voltage being developed between wire 54 from the center tap of this secondary and the wire 55 from the center tap of the high voltage secondary.

The wires 54 and 55 are connected to opposite ends of a bleeder resistor 56 comprising an upper portion 56a and a lower portion 56b, the upper portion preferably having several times the resistance of the lower portion and both having a high resistance. In the particular embodiment of this invention which I have constructed, I have found five hundred thousand ohms for resistance 56a and two hundred thousand ohms for resistance 56b to be satisfactory. It will be noted that the center point or connection between these two resistors is grounded, the portion 56b being in the cathode-plate circuit of the oscillator 45 in such a way that the lower end of the resistor 56b (connected to the wire 55) has a negative potential considerably below ground. The grid element 45a of the oscillator tube 45 is connected through the choke 51 and grid leak 52 to the wire 55, and the voltage across the resistor 56b is normally sufficient to bias the oscillator tube below cutoff and prevent its oscillation.

In order to control the illumination of the glow lamp 43 as a function of the voltage developed in the primary winding 21a during rotation of the rotor and independent of the breaker points, the alternating voltage thus developed is rectified and used to overcome the bias on the oscillator tube so that when the voltage in the magneto primary has reached a certain value, the oscillator will break into operation and the lamp 43 will be illuminated and will remain illuminated until the rectified voltage decreases to the point where the fixed bias again prevents operation of the oscillator.

This control action is effected by connecting the side of the primary winding which is normally connected to the breaker points to one side of a primary 57a of a transformer 57, the other side of this primary being grounded. The secondary 57b of this transformer is connected to the anodes 58a and 58b of a rectifying tube 58. The center tap of the secondary 58b is grounded through an appropriate resistor 60, which may have a value of fifteen hundred ohms, shunted by a conventional bypass condenser 61. This center tap is also connected through a blocking condenser 62 to the cathode 58c, a connection being taken from this through a variable control resistance or rheostat 63, which may be of three thousand five hundred ohms, maximum value, to the lower end of the biasing resistor 56b, a bypass for high frequency currents being provided by condenser 64 of fairly high value, as for example 4 mfd.

During electrical determination of the neutral position of the rotor, more fully described in my first-mentioned copending application, alternating voltage developed in the primary winding 21a of the magneto is rectified and delivered to the oscillator biasing resistor 56b in such a way as to oppose its voltage, control of the applied voltage being achieved through variation of the rheostat 63. The magneto rotor is driven in one direction at a certain speed and the rheostat adjusted to such a value that the lamp changes its illumination near top center position of the indicating disc, the point of change being noted on the calibrated scale, and then, without changing any of the adjustments of the magneto rotor, is driven in the opposite direction and the corresponding line of change of illumination noted, neutral position of the rotor then being midway between these points and the zero calibration of the scale 34 being set at this midposition, the scale being manually adjustable for this purpose.

Since the speed at which the magneto is being driven is important in testing the magneto, the magneto testing equipment is provided with a tachometer, identified in Figure 4 as 70 and here indicated as operatively connected to the drive shaft of the indicating disc. In testing devices which I have actually built, this tachometer is of the electric type, but it is merely diagrammatically illustrated since it is apparent that any conventional type of tachometer may be used, as that comprising an aluminum cup and a rotating magnet. The error in tachometers is sometimes appreciable, however, and it is highly desirable to be able to calibrate the accuracy of the tachometer at frequent intervals, as at the beginning of each test operation.

I have devised and am here disclosing a very simple and very accurate means of calibrating the tachometer, commercial alternating current being used as a reference source for this purpose. Referring to Figure 4, it will be seen that under normal conditions of operation the condenser 64 is connected to one side of the variable rheostat 63 through one element of a double-pole switch 71, so that movement of this switch to its other (or right-hand, speaking with respect to the position of the parts as shown in Figure 4) position opens the connection between the rheostat 63 and the condenser. At the same time, movement of this switch to its other or tachometer calibrating position closes a circuit between the lower end of the resistance portion 56b and ground. Under these conditions cut-off bias is shorted out or removed from the oscillator tube 45, and this tube oscillates whenever sufficient plate voltage is present. Opening the circuit of the condenser 64 eliminates its filter action, so that the current supplied to the plate of the oscillator tube is substantially unfiltered pulsating D. C., 7200 pulses per minute since 53 is a full wave rectifier. Under these conditions, the tube oscillates whenever the plate voltage is sufficiently high, that is about ⅓ or ½ of the time of each pulse; and the oscillation provides intermittent illumination of the lamp 43 in accordance with the frequency of the commercial alternating current supplied to the transformer 49. The tachometer may then be calibrated at several different points by varying the speed control of the motor driving the indicating disc. Energization of the biasing means of the oscillator in accordance with the alternations of the commercial current causes illumination of the glow lamp 7200 times per minute, since there are two pulses through the full wave rectifier 53 for each cycle. Accordingly, if the speed control of the motor driving the indicating disc is adjusted until two bands of light appear on the test disc (180 degrees apart), and these are standing still, the tachometer should read 3600 R. P. M. Similarly, if the speed control is adjusted until four equally spaced stationary light bands appears (90 degrees apart), the tachometer should read 1800 R. P. M., etc. When the tachometer has thus been calibrated, the switch 71 is turned off, connection made to the winding 21a, and the neutral position of the rotor determined. Then the connection to the winding 21a is removed and other tests made. For example, the magneto may be reconnected, as is customary in use, and the breaker points used to actuate the glow lamp. For this purpose, a connection is made from the lower end of the biasing resistor 56b through an on-off switch 73 to one of the breaker points, the other point being connected, in accordance with its normal arrangement, to ground. When the breaker points close, the negative bias causing the oscillator to be inoperative is thus shorted out and the glow lamp again illumined until the points open. This normally provides a clear indication of opening and closure time of the points at the various angular positions, but also indicates whether the points bounce after they close. Any bouncing of the points causes small dark bands in the band of general illumination.

I have also found that minute cracks and insulating imperfections in the distributor cap or insulating base 27 may be discovered by grounding the terminals to each side of the terminal under test, either simultaneously or in successive steps, and then energizing the terminal under test, by running the magneto, to determine if the usual voltage is present. Referring to Figure 2, points 28b and 28i would be grounded and 28a tested. This test would be made by energizing 28a with current from the magneto, and determining the length of spark gap which it would jump in air. Any considerable reduction in length of spark gap which the current will jump indicates voltage losses through insulating imperfections. This test should be conducted in sequence around the distributor, the contacts being grounded in sequence while the magneto is running, generally by grounding the "hot" terminal of the associated test spark gaps.

Referring now more particularly to Figures 5, 6 and 7, one form of selective gearing arrangement is illustrated, with the gears shown in Figures 5 and 6 being different from those shown in Figure 1, and the gearing arrangement shown in Figure 7 being still different. A frame, as the frame 80, supports a pair of shafts 35 and 38 in fixed relation to each other, this frame also supporting an arm 81 which is movable slidably and rotatably with respect to the frame. This is effected by providing the arm 81 with a slot 81a adapted to embrace a bolt 82. This arm carries another shaft 83, which carries the idler gear, as the gear 41 shown in Figure 1.

In the gearing combination shown in Figure 5, gears 84 and 85 are of the same size, and the shaft 83 is thus positioned, (by proper adjustments and locking of the arm 81) in approximately mid-position between the shafts 35 and 38, the idler gear 86 meshing with the gears 84 and 85.

In Figure 7 a different ratio is illustrated, the gear 87 on the shaft 35 being of smaller size than the gear 88 on the shaft 38. Under these conditions the arm has to be so adjusted that the shaft 83 is closer to the shaft 35 than it is to the shaft 38 to provide proper meshing of the idler gear 89 with both of the other gears. The gears in the other plane (to the right of the device as illustrated in Figure 6) always mesh with each other so that the ratio variations achieved by pairs of these gears are relatively small in number. In the plane of gearing best illustrated in Figures 5 and 7 (to the left as illustrated in Figure 6) different gears may be used on the shaft 35 in conjunction with the same gear on the shaft 38 merely by proper selection of the idler gear and adjustment of its shaft 83. This provides sufficient over-all changes in ratio to meet all of the gearing combinations encountered in conventional magnetos and with a very small number of different gears, generally less than a dozen.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described for testing a magneto having a winding, a rotor, breaker points for initiating a voltage surge, and a cam for actuating the breaker points, and wherein the cam is connected to the rotor for rotation at a given ratio thereto, including: a rotatable indicating member; means for connecting the rotor and member, this means including gearing adapted to have its ratio changed to cause such ratio to be matched to the first mentioned ratio; means for rotating the member and rotor; and indicating means adapted to be electrically connected to a part of said magneto and having a portion operatively associated with said member.

2. Apparatus of the character described for testing a magneto having a winding, a rotor, breaker points for initiating a voltage surge, and a cam for actuating the breaker points, and wherein the cam is connected to the rotor for rotation at a given ratio thereto, including: a rotatable indicating member; means for connecting the rotor and member, this means including gearing adapted to have its ratio changed to cause such ratio to be matched to the first mentioned ratio; means for rotating the member and rotor; and voltage responsive indicating means adapted to be electrically connected to said winding and having illuminating means operatively associated with said member.

3. Apparatus of the character claimed in claim 1, wherein the gearing includes a pair of shafts in fixed relation to each other and adapted to carry different gears and a movable shaft adapted to carry an idler meshing with the gears on said pair of shafts.

BUTLER J. HASKINS.

REFERENCES CITED

The following references are of record in the file of this patent:

UNITED STATES PATENTS

| Number | Name | Date |
|---|---|---|
| 1,297,462 | Hallenbeck | Mar. 18, 1919 |
| 1,349,958 | Head | Aug. 17, 1920 |
| 1,418,996 | Warrington | June 6, 1922 |
| 1,871,404 | Brown | Aug. 9, 1932 |
| 1,966,066 | Haskins | July 10, 1934 |
| 2,050,529 | Haskins | Aug. 11, 1936 |
| 2,057,871 | Allen | Oct. 20, 1936 |
| 2,057,968 | Paxton | Oct. 20, 1936 |
| 2,065,426 | Campbell | Dec. 22, 1936 |
| 2,070,623 | Satterlee | Feb. 16, 1937 |
| 2,091,320 | Kinsella | Aug. 31, 1937 |
| 2,108,835 | Wagner | Feb. 22, 1938 |
| 2,136,924 | Reitherman | Nov. 15, 1938 |
| 2,184,304 | Johnson et al. | Dec. 26, 1939 |